(12) United States Patent
Rice

(10) Patent No.: US 9,663,171 B2
(45) Date of Patent: May 30, 2017

(54) ARTICLE CARRIER FOR BICYCLE

(71) Applicant: Peter Rice, Worton, MD (US)

(72) Inventor: Peter Rice, Worton, MD (US)

(*) Notice: Subject to any disclaimer, the term of this patent is extended or adjusted under 35 U.S.C. 154(b) by 233 days.

(21) Appl. No.: 14/547,244

(22) Filed: Nov. 19, 2014

(65) Prior Publication Data
US 2016/0137246 A1    May 19, 2016

(51) Int. Cl.
*B62J 7/00* (2006.01)
*B62J 7/06* (2006.01)

(52) U.S. Cl.
CPC .. *B62J 7/00* (2013.01); *B62J 7/06* (2013.01)

(58) Field of Classification Search
CPC ........................ B60R 9/065; B62J 7/00–7/08
USPC ....... 224/419, 427, 428, 431, 432, 437–439, 224/441–444, 447
See application file for complete search history.

(56) References Cited

U.S. PATENT DOCUMENTS

| | | | |
|---|---|---|---|
| 398,945 A | 3/1889 | Credlebaugh | |
| 637,762 A | 11/1899 | Buley et al. | |
| 2,675,151 A * | 4/1954 | Herbert | B62J 9/00 220/6 |
| 3,322,313 A | 5/1967 | Giondi | |
| 3,888,397 A | 6/1975 | Koizumi | |
| 3,955,727 A | 5/1976 | Montgomery | |
| 3,955,728 A | 5/1976 | Jackson | |
| 3,955,729 A | 5/1976 | Montgomery | |
| 3,955,730 A | 5/1976 | Montgomery | |
| 4,003,508 A | 1/1977 | Hoops | |
| 4,056,219 A | 11/1977 | Hine, Jr. | |
| 4,066,196 A | 1/1978 | Jackson | |
| 4,260,086 A | 4/1981 | Hine, Jr. | |
| 4,282,993 A | 8/1981 | Humlong | |
| 4,313,548 A | 2/1982 | Edelson | |
| 4,415,105 A | 11/1983 | Jackson | |
| 4,440,332 A | 4/1984 | Kullen | |
| 4,542,839 A | 9/1985 | Levine | |
| 4,730,758 A | 3/1988 | McMurtrey | |
| 5,353,973 A | 10/1994 | McMurtrey | |
| 5,375,748 A | 12/1994 | Katz | |
| 5,406,816 A | 4/1995 | Thomas | |
| 5,655,694 A | 8/1997 | Keckelsen | |
| 5,765,733 A * | 6/1998 | Brule | A45F 3/04 224/153 |
| 6,062,053 A | 5/2000 | Ho | |
| 6,279,803 B1 | 8/2001 | Smerdon, Jr. | |
| 7,614,535 B2 | 11/2009 | Hubbe | |
| 8,011,542 B2 * | 9/2011 | Gandy | A45C 11/00 224/275 |
| 8,376,383 B1 | 2/2013 | Lee | |

(Continued)

*Primary Examiner* — Nathan J Newhouse
*Assistant Examiner* — Phillip Schmidt
(74) *Attorney, Agent, or Firm* — Howson & Howson LLP

(57) ABSTRACT

An article carrier, removably mountable on an upright luggage carrying frame of a bicycle, comprises a rigid sheath having closed top and an open bottom receiving the rigid frame. The rigid sheath fits into a downwardly open pocket of a flexible article-carrying bag. A rigid panel for supporting the bag is hinged to the sheath adjacent the bottom opening, and can be rotated downward from a condition in which it is parallel to a front wall of the sheath to a horizontal condition, and is prevented by a stop from being rotated beyond the horizontal condition. The downwardly open pocket can be on the exterior of the bag or on the interior.

6 Claims, 5 Drawing Sheets

(56) References Cited

U.S. PATENT DOCUMENTS

| | | | | |
|---|---|---|---|---|
| 8,398,103 B2* | 3/2013 | Jacobs | ................... | B62J 15/00 224/425 |
| 2003/0106974 A1 | 6/2003 | Guertin | | |
| 2009/0212084 A1 | 8/2009 | Lee | | |
| 2010/0237120 A1 | 9/2010 | Muhleberger | | |
| 2013/0062377 A1* | 3/2013 | Turner | ................... | B62K 3/002 224/276 |
| 2013/0284782 A1* | 10/2013 | Brown | ..................... | B62J 7/02 224/427 |

* cited by examiner

ARTICLE CARRIER FOR BICYCLE

FIELD OF THE INVENTION

This invention relates to article carriers, and particularly to removable article carriers for use with bicycles.

BACKGROUND OF THE INVENTION

Publicly shared bicycles have recently come into widespread use as convenient means of transportation, especially within crowded cities, where automobile parking spaces are expensive and difficult to find, and where privately owned bicycles tend to obstruct pedestrian passageways when parked, and are difficult to secure against theft.

The publicly shared bicycle is typically locked to a bicycle rack by a lock mechanism released upon insertion of a user's credit or debit card into a card reader. The user deposits the bicycle in a similar bicycle rack at his or her destination, and is charged accordingly.

The user of a publicly shared bicycle will often need to carry various articles, which cannot readily be carried on the person while operating the bicycle. A backpack can be used for this purpose, but backpacks that can be worn comfortably while operating a bicycle have very limited capacity. Many publicly shared bicycles, for example those provided by the Public Bike Sharing Company (PBSC), have luggage racks that are composed of a rigid frames that extend upright from brackets fixed to, and extending forward from the bicycle's steering column. Small containers such as purses and messenger bags can be placed on the forward-extending brackets and secured by attaching their straps to the upright frame. Larger containers can be positioned forward of the upright frame. However, securing these larger containers to the frame so that they do not come into frictional contact with the front tire of the bicycle is difficult.

There is a need, therefore, for a large-capacity article carrier that can be conveniently fitted to the upright frame of a bicycle luggage rack as described above, and that can be readily removed and used by the rider to transport its contents while walking to and from the bicycle.

SUMMARY OF THE INVENTION

This invention is intended to address the above-described need for an article carrier removably mountable on a luggage rack composed of a rigid frame extending upright from a bracket fixed to a bicycle. Briefly, the article carrier comprises an article-carrying bag fitted with a rigid sheath for placement over the upright frame of the bicycle luggage rack. The rigid sheath has, a top wall, front and rear walls, and opposed upright walls, each having a bottom edge. The bottom edges of said walls define a bottom opening for receiving the upright frame.

In a preferred embodiment, a rigid support panel is connected by a hinge to the bottom edge of the front wall of the rigid sheath. The hinge allows the support panel to be moved from a horizontal condition to a folded condition in which the support panel is in parallel relationship to the front wall of the sheath. A stop prevents the rigid support panel from being rotated about the hinge away from said one of said front and rear panels beyond its horizontal condition.

The article-carrying bag is formed of a flexible material, and includes a downwardly open pocket of a size closely fitting at least an upper portion of the sheath. A barrier at the upper end of the pocket is engageable by the top wall of the rigid sheath. The article-carrying bag, with the rigid sheath inserted into its downwardly open pocket can be removably mounted on the upright frame of the bicycle's luggage rack.

The hinged rigid panel can provide support for the part of the bag located forward of the upright frame.

The article-carrying bag can be formed with a bottom wall and a set of upright walls extending upward from the bottom wall, each upright wall having an inside face and an outside face. In such a bag, the bottom wall and the inside faces of the upright walls define an article-receiving compartment. The downwardly open pocket can be located on an outside face of one of the upright walls, and in that case, the bag can be mounted on the upright frame in such a way that all of its contents are located forward of the upright frame, and supported by the hinged panel.

Alternatively, the downwardly open pocket can be located within the interior of the bag, and the bottom wall of the bag is formed with an opening through which the rigid frame can extend into the pocket. In that case, the hinged panel supports the part of the bag that is located forward of the upright frame on the bicycle's luggage rack, while the part of the bag located rearward of the upright frame can be supported by the bracket that connects the upright frame to the bicycle's steering column.

Whether the pocket is internal or external, if the hinged support panel is utilized, the distance from the top wall of the rigid sheath and the hinge is preferably equal to the distance from the barrier at the upper end of the pocket to the bottom wall of the bag. The equality of these two distances ensures that the hinged panel properly supports the bag or a portion thereof when the support panel is in its horizontal condition.

DETAILED DESCRIPTION OF THE PREFERRED EMBODIMENTS

Figure 1:
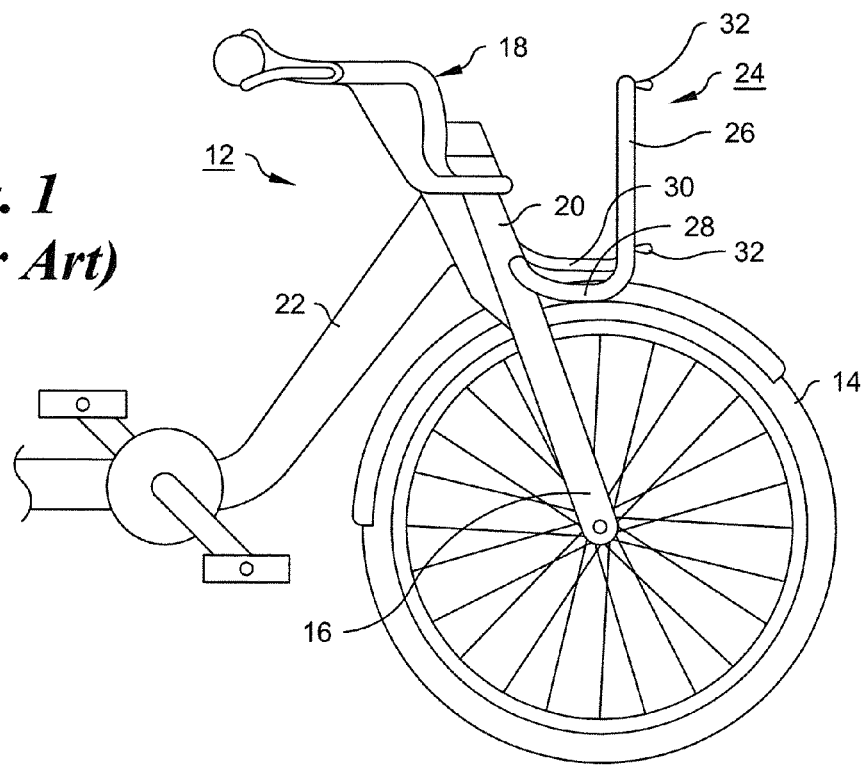
FIG. 1 is a side elevational view of the front part of a typical publicly shared bicycle, showing the upright frame and horizontal bracket of the bicycle's luggage rack.

The publicly shared bicycle 12 in FIG. 1 includes a steerable front wheel 14 rotatable on bearings (not shown) in a fork 16 connected to a handlebar 18 through a steering column 20 fixed to the bicycle frame 22.

A luggage rack 24 is composed of an upright frame 26 that is located forward of the steering column 20 and connected in fixed relation to the steering column by a bracket composed of bars 28 and 30. In a typical bicycle of this type, the bracket is composed of two bars 28, and three bars 30, positioned a short distance above the level of bars 28. The upright frame includes a bar in the shape of an inverted "U" and continuous with bars 28 of the bracket. Bars 30 reinforce the upright frame 26 and also provide a horizontal supporting surface for a bag or other cargo. The distance between the upright frame 26 and the steering column is relatively small, typically around eight inches (about 20 cm), and accordingly the available space behind the upright frame can accommodate only a small bag or a small amount of cargo. Larger bags or items of cargo can be strapped to the front of the upright frame 26, or secured to knobs 32 provided on frame 26. However, it is difficult to ensure that bag or other item on the front of the upright frame, is securely held so that it does not come into contact with the front wheel 14, or causes a fender to bend and contact the front wheel.

Figure 2:
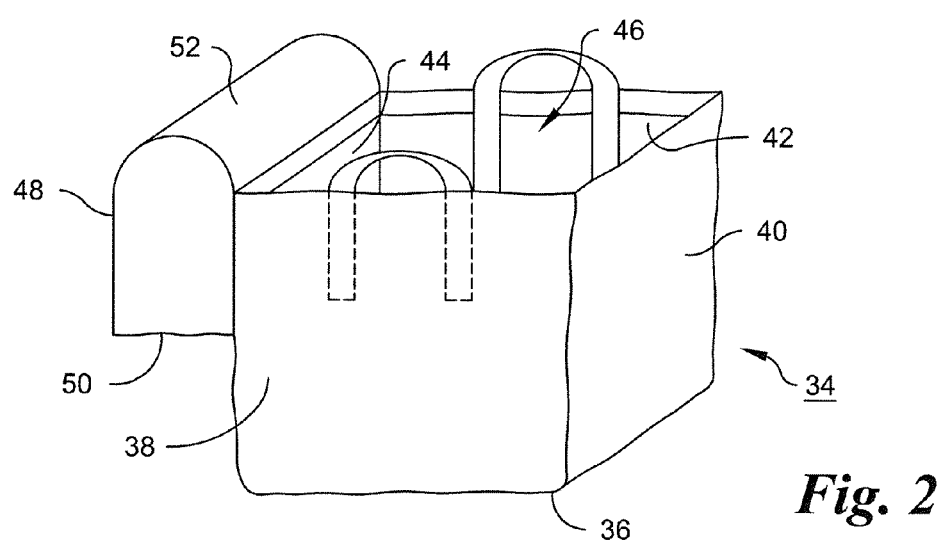
FIG. 2 is a perspective view of an article carrier in accordance with the invention, showing a downwardly open pocket on a rear upright wall of the article carrier.

The article carrying bag 34, shown in FIG. 2, is removably attachable to the luggage rack 24 of the bicycle in FIG. 1. The bag can be made of any of various materials. Examples of suitable materials include cotton fabric, waxed cotton fabric, sail cloth, canvas, ratan (wicker), polyester, metal wire, wool fabric, laminates of expanded PTFE, polyurethane and polyester, and similar laminates. Preferably, the bag is made highly flexible so that it can be folded for storage.

Bag 34, which is an example of a large variety of suitable bags has a bottom wall 36 and a set of four upright walls, 38, 40, 42 and 44, extending upward from the bottom wall. The bottom wall and the inside faces of the upright walls of the bag define an article-receiving compartment 46. The bag 34, shown in FIG. 2 is open-topped. However, one or more flaps (not shown) can be provided for closure of the opening at the top of the bag. Carrying handles 38 are sewn to upright walls 38 and 42.

A downwardly open pocket 48 is secured to an outside face of upright 44. This pocket, which is preferably made from the same flexible material from which the bag is made, has a bottom opening 50 and a barrier 52 at its upper end.

Figure 3:
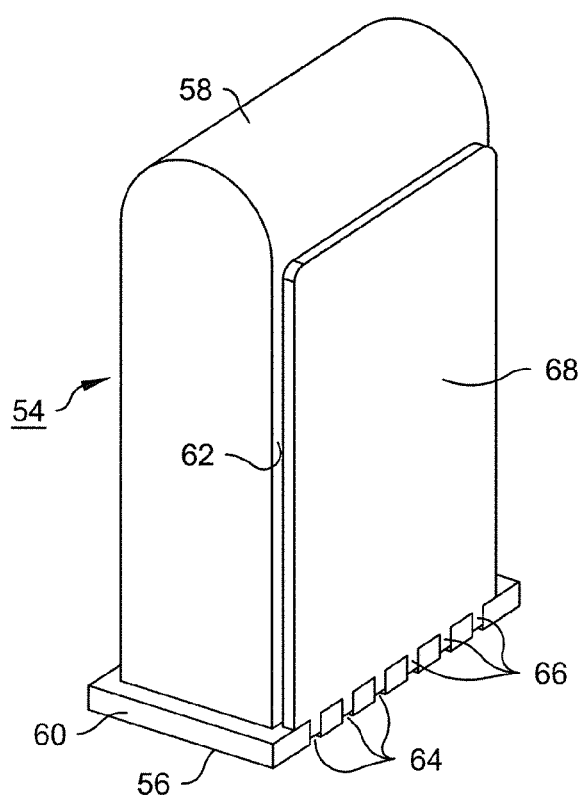
FIG. 3 is a perspective view of a rigid sheath in accordance with the invention, showing the hinged support panel in its folded condition.

The size of the pocket 48 is such that it can receive and fit closely onto the upper part of a rigid sheath 54 shown in FIG. 3. The sheath can be made from any of a wide variety of durable materials. Suitable materials include metals such as aluminum, and various plastics such as polypropylene, polycarbonate, acrylonitrile-butadiene-styrene (ABS), poly (vinyl chloride) (PVC), carbon fiber-reinforced polyesters, etc.

The shape of the upper part of the sheath conforms to the shape of the interior of pocket 48 when the pocket is expanded. An opening 56 is provided at the bottom of the sheath for receiving the upright frame 26 (FIG. 1) of the bicycle. The horizontal length of the sheath should be slightly greater than the length (measured in the widthwise direction of the bicycle) of the upright frame 26. The width of the sheath should be slightly greater than the maximum width of upright frame 26, taking into account the knobs 32, if present. The width of the sheath and the width of the frame are measured in the direction of the length of the bicycle). The term "slightly greater," when used with reference to the length and width of the sheath, refers to a tolerance sufficient to enable the sheath to fit over the upright frame 26 without excessive rattling when the bicycle is in motion. A positive tolerance in the range from one to two millimeters will ordinarily be adequate for this purpose.

Figure 4:
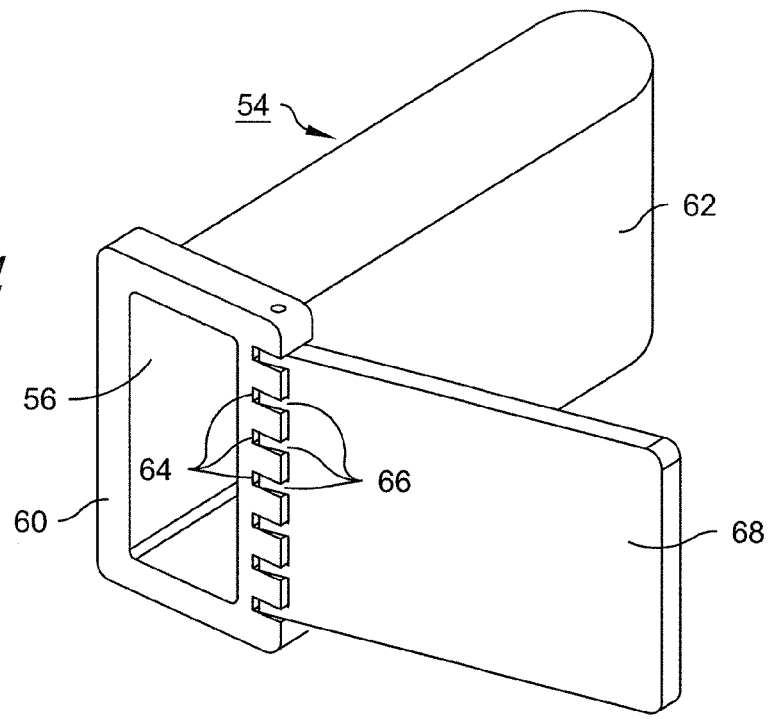
FIG. 4 is a perspective view of the rigid sheath of FIG. 3, showing the bottom opening of the sheath and showing the hinged support panel in its extended condition.

As shown in FIG. 3, the sheath is formed with a collar 60 extending around its bottom opening 56. The collar is preferably continuous, and formed as a unitary part of the sheath. The part of the collar extending along the bottom of the front wall 62 of the sheath is formed with a series of vertical slots 64 that receive hinge knuckles 66 extending from a rectangular panel 68. The slots 64 and knuckles 66 form a hinge that allows the panel 68 to be folded up into parallel relationship with the front wall, as shown in FIG. 3, and to be folded down, as shown in FIG. 4, into an extended condition.

The location of the hinge should be such that, when the sheath is fully inserted into the pocket 48, so that the upper end 58 of the sheath is in contact with barrier 52 at the top of the pocket, the bottom wall of the bag can rest on panel 68, when panel 68 is horizontal, without significant vertical compression of the bag.

The height of the sheath, measured from its bottom opening 56 to its top 58, should be greater than the distance from the upper end of the frame 26 of the luggage rack to the upper bars 30 of the bracket that connects the frame 26 to the bicycle's steering column, shown in FIG. 1.

Figure 5:
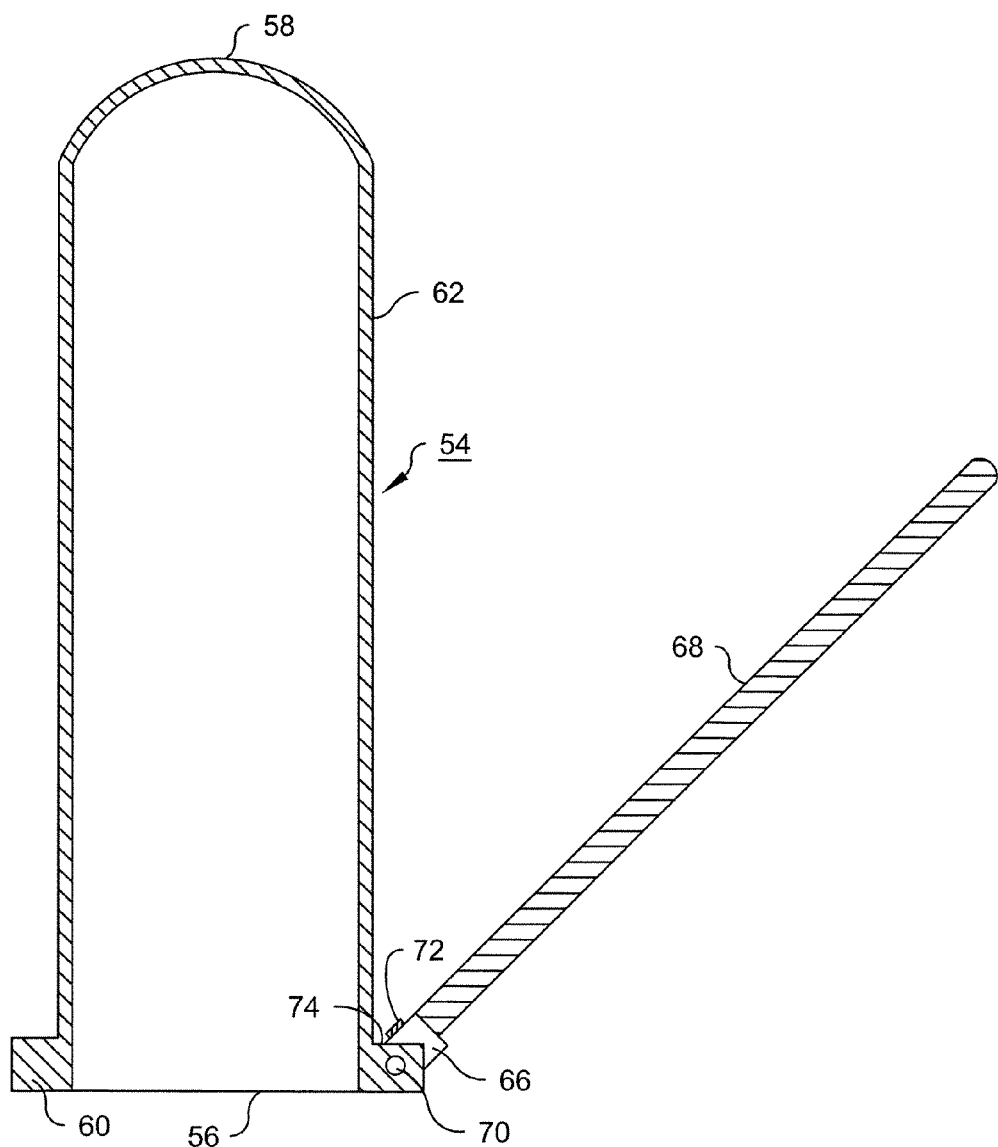
FIG. 5 is a cross-sectional view of the sheath.

FIG. 5 shows the sheath in cross-section, with its panel 68 partially rotated from its position parallel to the front wall 64 of the sheath to a partially extended condition. A rod 70 extends through the slotted part of the collar 60, and through holes in the knuckles 66, forming a pivot for the panel 68. A bar 72, which is preferably formed as a unitary part of the panel 68, extends across the knuckles and engages with a top surface 74 of the slotted part of the collar when the panel is rotated to perpendicular relationship with the front wall 64 of the sheath, i.e., to its horizontal condition. The engagement of bar 72 with the top surface 74 of the collar stops the rotation of the panel 68, preventing it from rotating past a 90° relationship with front wall 62, and enabling it to support the load imposed by the contents of the bag 34.

Figure 6:
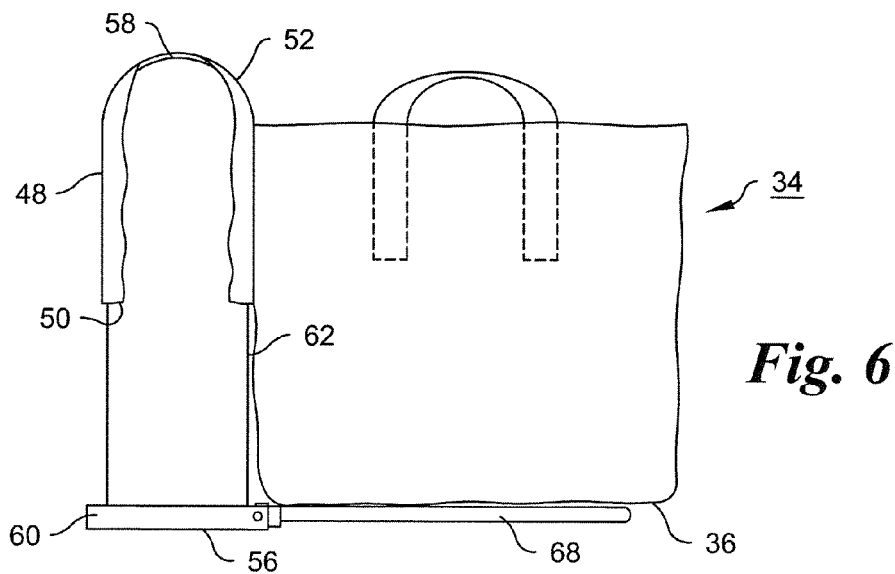
FIG. 6 is a side elevational view of the article carrier of FIG. 2, partially cut away to show the sheath of FIG. 4 fitted into the downwardly open pocket on the rear upright wall of the article carrier.

As shown in FIG. 6, before installing the article carrier on the bicycle, the hinged panel 68 is folded downward to a horizontal condition, in which it is perpendicular to the front wall 62 of the sheath. Then the sheath is inserted into pocket 48 of the bag. The bottom wall 36 of the bag rests on panel 68 while the top 58 of the sheath fits against the barrier 52 of the pocket. The assembly shown in FIG. 6 is now ready to be engaged with the upright frame on the bicycle's luggage rack in the manner illustrated in FIG. 7. Alternatively, the sheath can be fitted over the frame 26 before the pocket 48 of the bag is fitted to the sheath.

Figure 7:
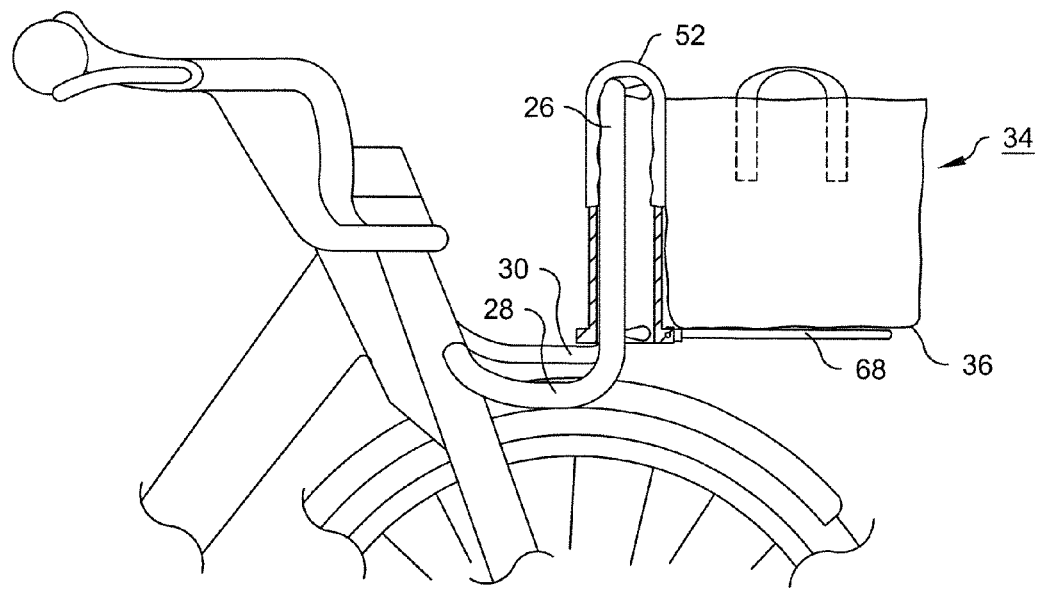
FIG. 7 is a side elevational view, partly in section, of a part of the bicycle of FIG. 1 showing the article carrier and sheath of FIG. 6 supported on the upright luggage carrier frame of the bicycle.

As seen in FIG. 7, the panel 68 is in its fully extended position, and supports bag 34. The panel can accommodate bags having a wide range of sizes, and, as shown in FIG. 7, the bag can extend forward beyond the forward edge of the supporting panel 68. It can also extend laterally beyond the side edges of the supporting panel. The height of the bag can also vary, but the pocket 48 should be positioned on the bag so that the bottom wall 36 of the bag rests on panel 68 while the top 58 of the sheath fits against the barrier 52 of the pocket as shown in FIG. 6.

Figure 8:
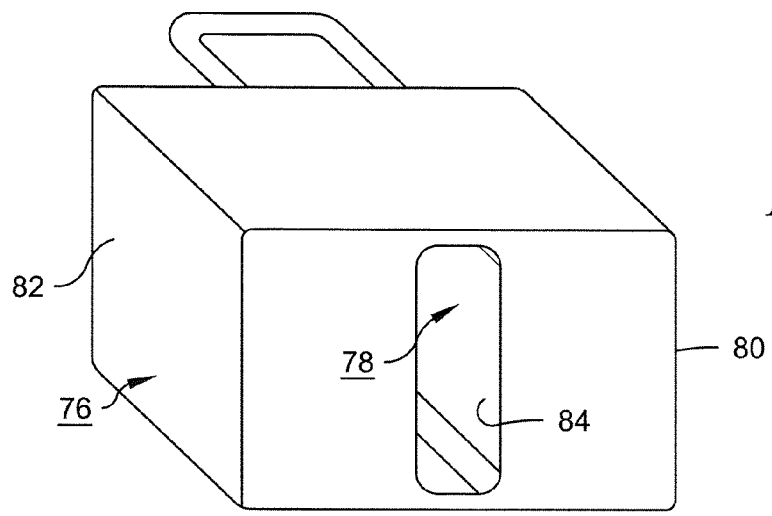
FIG. 8 is a perspective view showing the bottom side of an alternative embodiment of the article carrier, with a centrally located downwardly open pocket.
Figure 9:
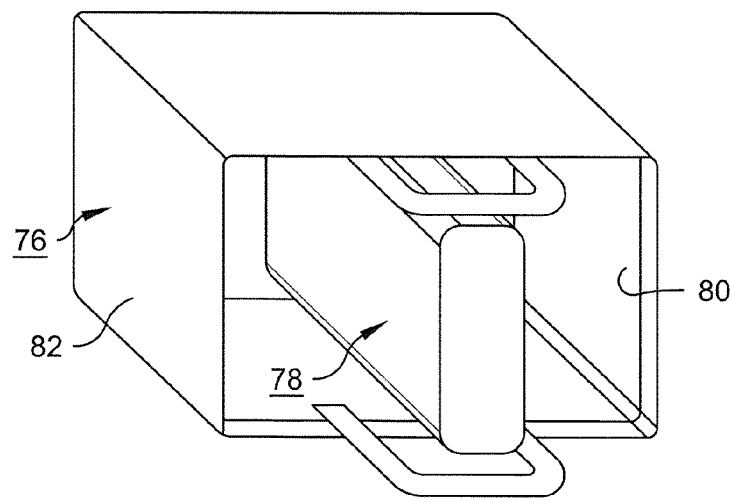
FIG. 9 is a perspective view showing the top side of the alternative article carrier in FIG. 7.
Figure 10:
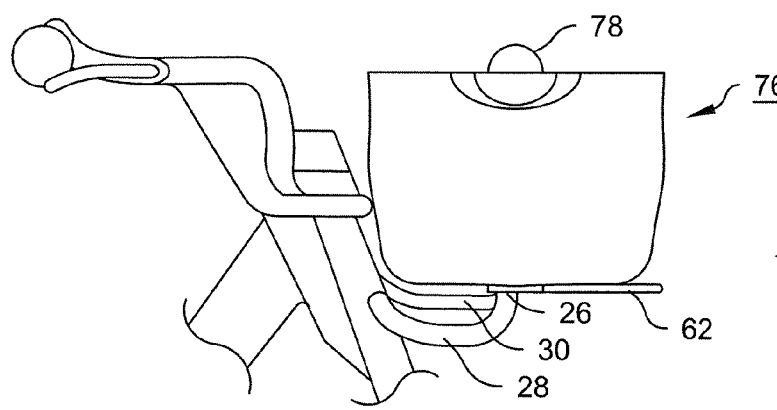
FIG. 10 is a side elevational view showing a part of the bicycle of FIG. 1 with the article carrier of FIGS. 8 and 9 supported on the upright luggage carrier frame of the bicycle, using a modified sheath and support panel.

In an alternative embodiment, illustrated in FIGS. 8, 9 and 10, the pocket is provided on the inside of the bag instead of externally on the back side of the bag. As shown in FIGS. 8 and 9, a bag 76 is formed with a pocket 78 at an intermediate location between the front and back sides 80 and 82 of the bag.

The sheath and hinged panel can be identical to the sheath and hinged panel shown in FIGS. 3-5. The upright supporting frame 26 of the bicycle (FIG. 10) extends into the sheath within pocket 78 through an opening 84 (FIG. 8) in the bottom of the bag.

In this alternative embodiment, the hinged panel on the sheath supports the front part of the bag while the rear part of the bag can rest on the upper bars 30 of the bracket that connects the upright supporting frame 26 to the bicycle's steering column. Locating the pocket inside the bag makes it possible to use a bag having a greater carrying capacity for small articles.

Many modifications can be made to the article carrier and sheath assembly described above. Alternative stop mechanisms can be used to prevent the supporting panel 68 from rotating past its horizontal condition. For example, the stop mechanism can comprise an element on the supporting panel 68 that engages the underside of the collar 60 when panel 68 is horizontal. The sheath 54 and the supporting panel 68 do not need to be composed of continuous sheets. They can have openings for weight reduction, and can be in the form of a wire mesh, for example, as long as they have sufficient rigidity to sustain the weight of the bag and its contents. Still other modifications can be made to the carrier and sheath assembly without departing from the scope of the invention, which is defined by the following claims.

What is claimed is:

1. An article carrier removably mountable on a luggage rack composed of a rigid frame extending upright from a bracket fixed to a bicycle, the carrier comprising:
    a rigid sheath having, a top wall, front and rear walls, and opposed side walls, each of said walls having a bottom edge, and a bottom opening, defined by the bottom edges of said walls, for receiving said rigid frame;
    a rigid support panel;
    a hinge connecting the rigid support panel to the bottom edge of said front wall, said hinge allowing the support panel to be moved from a horizontal condition to a folded condition in which the support panel is in parallel relationship to said front wall of the sheath;
    a stop preventing the rigid support panel from being rotated about the hinge away from said one of said front and rear panels beyond its horizontal condition; and
    an article-carrying bag formed of flexible material, and including a downwardly open pocket of a size closely fitting at least an upper portion of said sheath, said downwardly open pocket having an upper end and a barrier at said upper end for engagement by the top wall of the rigid sheath;
    whereby the article-carrying bag, with said rigid sheath inserted into its downwardly open pocket, and with said bag engaged with, and supported by, said rigid support panel, can be removably mounted on said rigid frame extending upright from a bracket fixed to a bicycle.

2. The article carrier according to claim 1, wherein said article-carrying bag is formed with a bottom wall and a set of upright walls extending upward from said bottom wall, each of said upright walls of the bag has an inside face and an outside face, said bottom wall and said inside faces of the upright walls of the bag define an article-receiving compartment, and said downwardly open pocket is located on an outside face of one of said upright walls.

3. The article carrier according to claim 1, wherein said article-carrying bag is formed with a bottom wall and a set of upright walls extending upward from said bottom wall, each of said upright walls of the bag has an inside face and an outside face, said bottom wall and said inside faces of the upright walls of the bag define an article-receiving compartment, said downwardly open pocket is located within the interior of said bag, and said bottom wall of the bag is formed with an opening through which said rigid frame can extend into said pocket.

4. The article carrier according to claim 1, wherein the distance from the top wall of the rigid sheath and the hinge is equal to the distance from said barrier at the upper end of the pocket to the bottom wall of the bag.

5. The article carrier according to claim 1, wherein said hinge comprises:
    slots formed in a part of a collar surrounding said bottom opening of the sheath, said collar being formed as a unitary part of the sheath; and
    knuckles formed on said rigid support panel and extending into said slots.

6. A sheath assembly supporting an article-carrying bag on a luggage rack composed of a rigid frame extending upright from a bracket fixed to a bicycle, the sheath comprising:
    a rigid sheath having, a top wall, front and rear walls, and opposed side walls, each of said walls having a bottom edge, and a bottom opening, defined by the bottom edges of said walls, for receiving said rigid frame;
    a rigid support panel;
    a hinge connecting the rigid support panel to the bottom edge of said front wall, said hinge allowing the support panel to be moved from a horizontal condition to a folded condition in which the support panel is in parallel relationship to said front wall of the sheath; and
    a stop preventing the rigid support panel from being rotated about the hinge away from said one of said front and rear panels beyond its horizontal condition;
    whereby an article-carrying bag, formed of flexible material and having a bottom wall and a downwardly open pocket, can be removably supported on said rigid frame by insertion of said sheath into said downwardly open pocket of the article-carrying bag and engagement of the bottom wall of said bag with said rigid support panel.

* * * * *